No. 729,364. PATENTED MAY 26, 1903.
G. H. LEE.
CAMERA.
APPLICATION FILED JAN. 8, 1903.
NO MODEL.
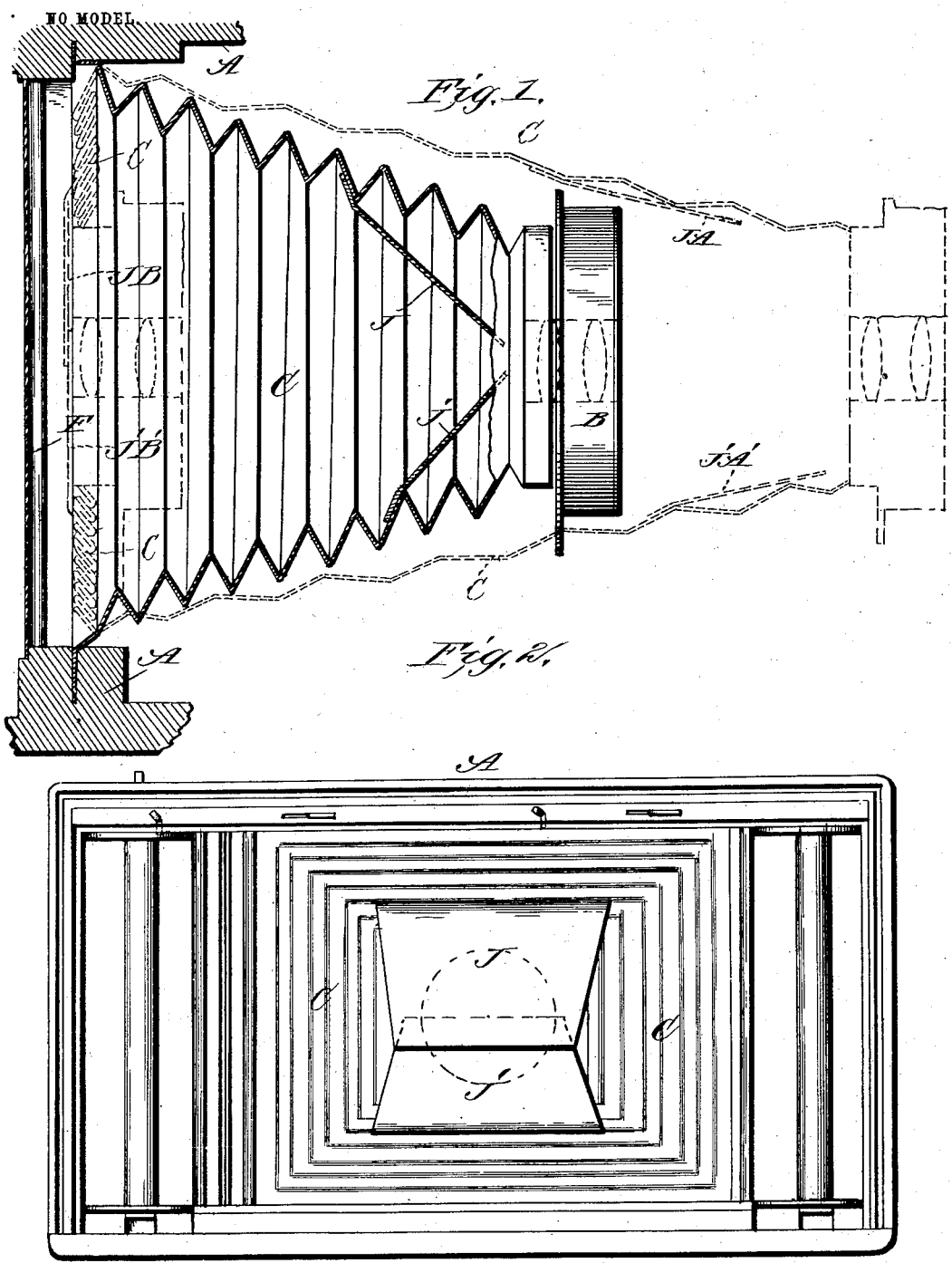
WITNESSES: INVENTOR
George H. Lee
BY
ATTORNEYS.

No. 729,364. Patented May 26, 1903.

UNITED STATES PATENT OFFICE.

GEORGE H. LEE, OF OMAHA, NEBRASKA.

CAMERA.

SPECIFICATION forming part of Letters Patent No. 729,364, dated May 26, 1903.

Application filed January 8, 1903. Serial No. 138,280. (No model.)

*To all whom it may concern:*

Be it known that I, GEORGE H. LEE, a citizen of the United States, and a resident of Omaha, in the county of Douglas and State of Nebraska, have made certain new and useful Improvements in Cameras, of which the following is a specification.

The object of my invention is to provide a means for preventing the accidental or inadvertent exposure of a sensitive film or plate while the bellows of the camera is folded but the camera-door open. It sometimes happens that the careless or inadvertent pressure upon the shutter-working bulb will ruin an exposed film or prematurely expose a sensitive film. My invention is designed to prevent this; and to that end it consists, broadly, in an automatic shutter connected to and worked by the movement of the bellows in folding and unfolding, as will be hereinafter fully described with reference to the drawings, in which—

Figure 1 is a longitudinal section through a bellows-camera, showing in full lines the bellows partly extended and showing in dotted lines two other positions of the bellows, the one being fully extended and the other fully closed. Fig. 2 is a rear view looking into the bellows from the sensitive film toward the lens.

In the drawings, A represents the framework of the camera.

B is the lens, and C the bellows connecting the lens to the framework.

F represents the sensitive film or plate behind the bellows.

My invention consists of two opaque wings J J' of some light material—such as stiff black paper, hard rubber, or celluloid—which wings are attached by glue or small rivets to the inner walls of the bellows. The edges of these wings are so caught in the plaits or folds of the bellows that when the bellows is fully extended and the plaits or folds are drawn out nearly straight these wings lie flat against the walls of the bellows, as indicated by the dotted lines J A J' A', which permits the full image of the lens to be thrown onto the sensitive film or plate F, and when the bellows is fully folded the position assumed by the plaits or folds of the bellows causes these wings to lap fully across the field, as shown in full lines in Fig. 2 and by the dotted lines J B J' B' in Fig. 1, thus completely masking the film or plate from the lens, so that if the shutter-bulb be accidentally worked it does not spoil the film. This action is accomplished in a perfectly automatic manner by the mere drawing out and shutting up of the bellows and by the most simple, reliable, and practical construction, costing only a trifle for its application to any camera.

I have shown two wings J and J' as forming the preferable arrangement; but it is obvious that one, two, or more of such wings might be employed.

Having thus described my invention, what I claim as new, and desire to secure by Letters Patent, is—

1. A bellows-camera having attached to the same a shutter connected to and automatically operated by the movement of the bellows in the act of opening or closing the same substantially as described.

2. A bellows-camera having one or more wings attached to the interior walls of the bellows and arranged to be moved away from before the field when the bellows is extended, and to be thrown across the field when the bellows is shut up substantially as described.

3. A bellows-camera having one or more wings fastened into the plaits of the bellows and arranged to partake of the movement of the plaits in the extension and withdrawal of the bellows, to open or close the field at a point between the lens and the sensitive film or plate substantially as described.

GEORGE H. LEE.

Witnesses:
EDWD. W. BYRN,
SOLON C. KEMON.